Patented July 10, 1951

2,560,156

UNITED STATES PATENT OFFICE 2,560,156

METHOD OF SEPARATING CARBOXYLIC ACIDS RESULTING FROM THE LIQUID PHASE OXIDATION OF OLEIC ACID

Robert Morris Cavanaugh and Robert Howard Weir, Woodbury, N. J., assignors to E. I. du Pont de Nemours & Company, Wilmington, Del., a corporation of Delaware No Drawing. Application December 18, 1947, Serial No. 792,600

7 Claims. (Cl. 260—485)

This invention relates to a process for obtaining carboxylic acids from their mixtures with one another and with other materials, and more particularly to a process for separating such acids from the other products resulting from the nitric acid oxidation of oleic acid.

The aliphatic dicarboxylic acids, which are derivatives of the linear saturated hydrocarbons and have terminal carboxyl groups, are important chemical compounds industrially. The present invention is particularly concerned with the oxidation products of oleic acid when nitric acid is employed as oxidant. When such a reaction is carried out, a mixture is obtained comprising aqueous nitric acid, various monocarboxylic acids, of which pelargonic is the principal representative, and a mixture of dicarboxylic acids. Azelaic and suberic are the predominant acids present of the latter group and are present in amounts corresponding to practical yields. These acids, both in their free state and as their alkyl esters, have important industrial applications as synthetic lubricants and in the plastics and synthetic textile fields, etc.

While azelaic, suberic and other carboxylic acids are present in satisfactory quantities in the oxidation reaction mixture, they are desired in relatively pure form, substantially free from contaminants. Because of the similarity of properties, however, the separation and isolation of the individual acids is extremely difficult, without considerable loss of product.

Various methods have been proposed for the separation of the higher dicarboxylic acids, including solvent extraction procedures, fractional precipitation and the like, but none of the methods suggested has been altogether satisfactory.

An object of the present invention is a simple and improved process for separating aqueous mixtures containing nitric acid and various aliphatic mono- and dicarboxylic acids such as result on oxidation of oleic acid. A still further object is such a method whereby azelaic, suberic and other higher dicarboxylic acids are recovered as the alkyl esters of the respective acids. Additional objects will be disclosed as the invention is described at greater length hereinafter.

We have found that the foregoing objects are accomplished, and a desirable method of separation achieved, when we utilize as starting material the reaction mixture resulting from the oxidation of oleic acid by means of nitric acid and treat this according to the successive steps of removing the nitric acid by distillation under reduced pressure, separating the mono-carboxylic acids and the lower boiling dicarboxylic acids by vacuum distillation, esterifying the residual higher boiling dicarboxylic acids by means of a normally liquid monohydric alcohol in the presence of a catalyst, washing with water, and removing the resulting esters by fractional distillation. Using a procedure such as that described, a satisfactory separation of the various products is possible, and there is relatively slight loss of products because of contamination and incomplete separation. According to previous methods of treatment, the practice has been to drown the oxidation mixture in an excess of water, whereby separation into layers occurred. Dilution of the nitric acid took place, of course, with such a procedure, and, if subsequent utilization was desired, the cost of concentration entered in. This additional labor and expense is obviated by the present method. Pelargonic acid is obtained as the principal ingredient in the monocarboxylic acid portion, and suberic and azelaic acids as the esterified mixture. Separation of the esters of the dicarboxylic acids is accomplished much more readily than of the free acids themselves.

The invention will be illustrated more clearly by the following example, but without restrictions or limitations thereby.

The reaction vessel comprised a 5-liter glass flask equipped with agitation means, and into this was introduced about 2630 grams of 95% nitric acid. Into this acid was fed over a period of 2¾ hours 1000 grams of commercial oleic acid at a temperature of 40° C. After the end of the feeding period, the mixture was heated for an additional 4½ hours at 40° to 75° C., at which time the reaction mixture comprised a homogeneous solution, and the reaction was considered sufficiently complete. The nitric acid was then removed from the mixture by distillation at a reduced pressure of around 40 mm. and at a temperature not above 67° C. The nitric-free mixture was then further distilled at a pressure of 5 to 20 mm. at a more elevated temperature, and a fraction obtained containing the monocarboxylic acids and some of the lower dicarboxylic acids. Employing the same reaction vessel, 1000 grams of normal propanol and 6.5 grams of 95% sulfuric acid were added to the oxidation mixture comprising the higher dicarboxylic acids. Solution was effected and this was heated to boiling with agitation, fresh propanol in the amount of about 125 cc. per hour being added to replace the water-propanol mixture removed. This distillation was continued for about 15 hours. The mixture of esters of the higher dicarboxylic acids in the reactor was then washed with water, distilled fractionally under reduced pressure and with varying pressures as the fractions removed changed from low boiling to high boiling esters. The boiling range for the highest boiling ester, dipropyl azelate, was 166 to 168° C. at 5 mm. pressure.

Operating in the manner described, the portions separated from the oxidation mixture comprised the general groups, (1) aqueous nitric acid of about 64% strength substantially free from organic material, (2) a mixture of monocarboxylic acids, together with some lower boiling dicarboxylic acids, with pelargonic acid predominating, and (3) a mixture of esters of the higher dicarboxylic acids, the esters of suberic and azelaic acids comprising the larger part of the mixture. The nitric acid recovered could, of course, be concentrated and reused in a subsequent operation. The monocarboxylic acid fraction contained some lower dicarboxylic acids, e. g., succinic and glutaric acids, and these were removed by hot water washing before separation of the mono acids by distillation, whereby 28.3 grams of insoluble monocarboxylics was obtained per 100 grams of oleic acid, of which about 14.4 grams was pelargonic acid. The higher dicarboxylic acids in the mixture of esters amounted to about 45 grams, in which azelaic and suberic acids were present in about a 60 to 40 proportion. The individual esters were isolated. In many cases, the further application of the dicarboxylic acids allowed or favored the use of the alkyl esters, but, when desired, the free acids were readily obtained by saponification.

In the nitric acid oxidation of oleic acid, various carboxylic acids are obtained, as has been pointed out. Pelargonic acid is the predominant monocarboxylic acid, with minor amounts of caprylic, heptanoic, caproic and valeric acids. The chief dicarboxylic acids formed are azelaic and suberic acid, which may comprise between 75 and 80% by weight of the total dicarboxylics, with smaller percentages of pimelic, adipic, glutaric, and succinic acids. As shown previously, the lower dicarboxylic acids will probably come over to a considerable extent with the monocarboxylic acids, on distillation, and can be separated therefrom by taking advantage of their greater solubility in water. Azelaic and suberic acids are the dicarboxylic acids desired in accordance with the present invention.

In the esterification of the higher dicarboxylic acids prior to their separation, propanol has been the alcohol employed in the specific example cited. Other normally liquid monohydric aliphatic alcohols may be used, however, for example methanol, ethanol, butanol, 2-ethylhexanol, etc.

The process described in the present invention has very definite advantages over those previously disclosed, particularly with respect to simplicity and directness of procedure. Since there is no dilution of the nitric acid content, recovery and re-utilization of this important ingredient is accomplished without the expenditure of heat for concentration in driving off the water previously introduced. Substantially the same equipment can be employed for the successive operative steps, without transfer of material. Esterification can be carried out in the same reaction vessel as previously used for reaction and distillation, and separation of the esters is effected readily. In many cases, the alkyl esters are an advantageous form for direct use or for the manufacture of other chemical products. Where the free acids are desired, these may be obtained readily by saponification.

The invention has been disclosed at length in the foregoing. It will be understood, however, that many variations in details of procedure, operating conditions and reagents may be introduced without departure from the scope of the invention. In the procedure described in the examples, for instance, the dicarboxylic acids have been esterified prior to distillation, but we may prefer to distill the free acids themselves under reduced pressure, either by dry or steam distillation. Likewise, esterification may be carried out immediately after removal of the aqueous medium and both the mono and the dicarboxylic acids be separated by fractional distillation of their alkyl esters.

We intend, therefore, to be limited only by the following claims.

We claim:

1. In the separation of an aqueous mixture containing nitric acid, aliphatic monocarboxylic and aliphatic dicarboxylic acids, the steps comprising removing completely the water and nitric acid and then the monocarboxylic acids by distillation under reduced pressure, esterifying the residual dicarboxylic acids without previous crystallization by means of a normally liquid monohydric alcohol, and separating the resulting esters by distillation.

2. In the separation of the carboxylic acids resulting from the liquid phase oxidation of oleic acid by means of nitric acid, the steps comprising removing completely the water and nitric acid by distillation under reduced pressure, subsequently distilling off the monocarboxylic acids and the lower boiling dicarboxylic acids under reduced pressure, esterifying the residual higher boiling dicarboxylic acids by means of a normally liquid monohydric alcohol, and separating the resulting esters by distillation.

3. The process of claim 2, in which dicarboxylic acids are removed by water extraction from the portion comprising the mono-carboxylic acids and lower dicarboxylic acids.

4. The process of claim 2, in which esterification is effected by means of propanol.

5. The process of claim 2, in which esterification is effected by means of butanol.

6. The process of claim 2, in which esterification is effected by means of ethylhexanol.

7. In the separation of the carboxylic acids resulting from the oxidation of oleic acid by means of nitric acid, the method of obtaining esters of suberic and azelaic acids which comprises removing completely the water and nitric acid from the reaction mixture by distillation under reduced pressure, subsequently distilling off the monocarboxylic acids and the lower dicarboxylic acids under reduced pressure, esterifying the residual higher boiling dicarboxylic acids by means of a normally liquid aliphatic alcohol, fractionally separating by distillation the resulting mixture of esters, and obtaining in substantially separated form the esters of suberic and azelaic acids respectively.

ROBERT MORRIS CAVANAUGH.
ROBERT HOWARD WEIR.

REFERENCES CITED

The following references are of record in the file of this patent:

UNITED STATES PATENTS

| Number | Name | Date |
| --- | --- | --- |
| 2,193,562 | McAllister | Mar. 12, 1940 |
| 2,203,680 | Kellingboe | June 11, 1940 |
| 2,269,998 | Czerwin | Jan. 13, 1942 |
| 2,285,601 | McAllister | June 9, 1942 |
| 2,365,290 | Price | Dec. 19, 1944 |